May 1, 1956  J. E. FLOOD  2,744,153
INSULATED WIRE
Filed Jan. 23, 1951
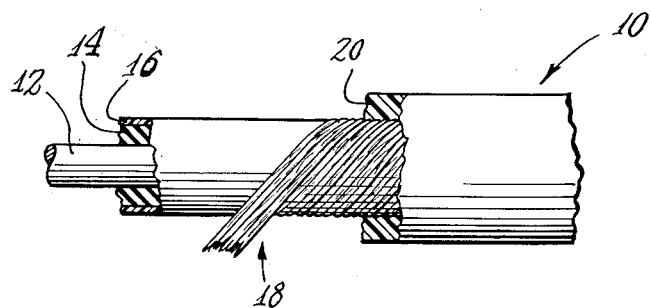
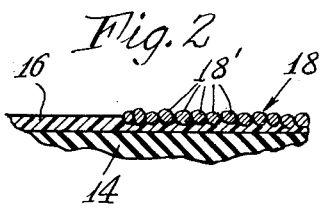
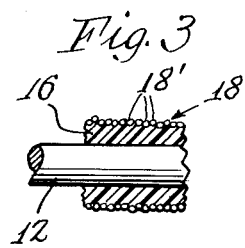
Inventor
James E. Flood
By
Johnson and Kline
Attorneys

United States Patent Office 2,744,153
Patented May 1, 1956

2,744,153
INSULATED WIRE

James E. Flood, Norwich, Conn., assignor to The Plastic Wire & Cable Corporation, Borough of Jewett City, New London County, Conn., a corporation of Connecticut Application January 23, 1951, Serial No. 207,342

5 Claims. (Cl. 174—121)

This invention relates to electrical conductor insulating materials and more particularly to insulating materials comprising fibrous or filamentary glass materials, and to methods of applying the same to electrical conductors or cables.

Fibrous or filamentary glass materials are particularly adapted for use as insulating and strengthening materials for wrapping or winding on electrical conductors or cables inasmuch as they possess many desirable properties, such as good insulating characteristics, noninflammability, high resistance to heat and moisture, excellent resistance to chemical action, high tensile strength and high strength-weight ratio, etc. Many of these valuable properties, however, and particularly that of high tensile strength, cannot be fully realized upon, or taken advantage of, due to the low extensibility or low elongation characteristics of the glass filaments under a load which causes a rapid breakdown and rupture of the insulating materials. Whenever an electrical conductor or cable having filamentary glass insulation is twisted or flexed, it is found that many of the individual glass fibers thereof break with the result that, after considerable flexing thereof, the fibrous glass insulation is completely ruptured and of no value as insulatory material, inasmuch as the insulating characteristics and protection against heat, moisture, chemical action, etc., are gone. Such rupture of the insulation is particularly present in those uses of the conductor requiring considerable bending or flexing thereof, such as in snaking through conduit, sagging buildings, such as farms, warehouses, etc.

It has now been established that this is due to the fact that it is substantially impossible to wind or wrap the filamentary glass insulation on the conductor or cable in such a way that all the glass filaments are equally tensioned and share the applied load to the same extent. No matter how painstaking or accurate the winding operation is, there are bound to arise slight inequalities in the tensions existing between the individual glass filaments. Inasmuch as these filaments have substantially no elongation, the shortest ones, or those which are the straightest, being wound under very slightly greater tension, take up the load first and do not elongate to a degree sufficient to permit the other glass filaments to assist in carrying the load. As a result, the shortest filaments will break under the load and such breaking will continue progressively until all of the glass filaments in the wrapping or winding are eventually broken.

As a result, fibrous glass insulating materials have not been as widely used as would be predicted by its superior characteristics and properties.

It is a purpose of the present invention to provide for a method of winding or wrapping glass filamentary material on an electrical conductor whereby all the filaments will be equally tensioned so as to share the applied forces equally.

It is a further purpose of the present invention to provide an electrical conductor with filamentary glass insulating materials whereby all the superior characteristics and properties thereof will be realized upon and utilized.

An advantage of the present invention is the provision of an electrical conductor with fibrous or filamentary glass insulating materials wherein the desirable characteristics and properties are realized, including high tensile strength, without any disadvantages due to the low elongation characteristics of glass filaments.

In the manufacture of A—Z cable (Patent No. 2,663,-755) or any cable of similar construction wherein a fabricated protective and strengthening barrier is positioned between an inner primary insulating jacket and an outer protective insulating jacket, difficulty has frequently been encountered in the unraveling or sleeving of the fabricated barrier on the primary jacket prior to application of the outer protective jacket. This creates bunching and an unevenly distributed insulating outer coating which is highly undesirable and which renders the electrical conductor inferior in quality and defective in workmanship.

Additionally, this sleeving or axial slipping of the barrier causes an increased chafing or rubbing action between adjacent filaments which become overlapped to cut across one another whereby some of them are broken to weaken the overall construction and wherein the broken filaments protrude from the barrier itself or even break loose therefrom.

In the event that the outer protective insulating jacket is deposited on the barrier-covered inner jacket by an extrusion process, the unevenness and bunching caused by the unraveling or sleeving of the barrier frequently causes difficulties in the passage of the primary jacketed conductor through the close fitting guide tip which holds it in the center of the extruding die during the extrusion thereon of the outer jacket. Additionally, any fibers or filaments which break off from the protective barrier may collect in the guide tip and may frequently clog the small clearance thereat to cause the conductor to jam and be broken, or to break parts of the extruding apparatus.

Glass filaments, as noted above, possess highly desirable properties and characteristics for such protective barriers but it is to be observed that the difficulties of sleeving and unraveling are increased by the selection of such a filament, due to the well known inherent slippery characteristic of the glass filaments, which characteristic is present to a greater extent in glass filaments than in such fibers as cotton, silk, etc. Additionally, the possibility of breakage is increased due to the flexing of the barrier-covered inner jacket as it is guided to and within the extrusion device which causes the glass filaments having low elongation characteristics to break and cause the difficulties previously described.

It is therefore another purpose of the present invention to provide for an electrical conductor wherein the protective barrier is securely and firmly positioned on the inner primary jacket at once and the filament configuration thereof is sufficiently strong to resist breaking down during processing and manufacture thereof.

It is still another purpose of the present invention to provide for an electrical conductor wherein glass filamentary material is used as an insulating and strengthening barrier without involving the difficulties of unraveling or sleeving thereof or the disadvantages of fiber breakage.

Other purposes and advantages will appear in the following description of the preferred embodiment of the invention referring to the accompanying drawing, in which:

Figure 1 is a fragmentary section of the electrical conductor showing the various stages of the manufacture of its insulating materials.

Fig. 2 is a fragmentary section of the electrical conductor in enlarged scale showing the embedding of the glass filaments in the spongy coating.

Fig. 3 is a fragmentary section of the electrical conductor in enlarged scale showing the application of the spongy cementitious material directly to the metallic conductor.

In the embodiment of the invention shown in the drawings, the electrical conductor 10 comprises a metallic conductor 12 of solid or stranded copper or the like, upon which is coated or deposited, such as by extruding, for example, the insulating material which comprises the inner primary jacket 14.

The primary jacket 14 may be formed of such synthetic resins as polyvinyl chloride, polyvinyl chloride-polyvinyl acetate copolymer, or a polyvinyl chloride-vinylidine chloride co-polymer, or cellulose acetate, or synthetic rubber, etc., and should be of a nature so as to be softened or etched by a solvent borne coating or cement 16 which is applied to the outer surface thereof.

The cement 16 may be applied to the primary jacket 14 by a flow process wherein the primary jacketed conductor is run through a container of the cement, or it may be deposited by an applicator process wherein the cement is deposited thereon with the thickness of the coating controlled by a die.

Due to the solvent action upon the primary jacket 14, which softens or etches the outer surface thereof, the coating or cement 16 is adhered thereto firmly in substantially an integral relationship.

The solids content of the applied coating or cement 16 should be sufficient to form a film of several thousandths thickness. For this purpose, it has been found that the co-polymer of vinyl chloride and vinylidene chloride is more adaptable for deposition of such a thick film and is the preferred species of the above-mentioned resins. This resin has the property of being readily soluble in a number of hydrocarbon solvents such as toluene or xylene, or in ketones such as methyl ethyl ketone, or in high aromatic naphthas, up to 50% by weight of solids by a simple agitation, whereas the cements prepared from polyvinyl chloride or the co-polymer of polyvinyl chloride and polyvinyl acetate have high viscosities and low solids contents which is not as desirable inasmuch as the thicker films are not as easy to deposit. This, however, does not prevent the deposition of the preferred thickness of cement film on the primary insulating jacket.

Using a #14 solid A. W. G. conductor (0.064") and a 1/32" thickness of primary jacket insulation, the following film thicknesses were found to be deposited on evaporation of the solvent-carried polyvinyl chloride-vinylidene chloride co-polymer:

|  | Inch |
|---|---|
| 20% solids | 0.0035 |
| 25% solids | 0.0045 |
| 30% solids | 0.006 |
| 40% solids | 0.007 |

For the intents and purposes of the present invention, the preferred percentage of solids has been established to be 30% with the satisfactory range extending from 25 to 40%. The thickness of coating or film which has been found most satisfactory has been established to be of the order of 0.006" with the preferred range extending from about 4% up to about 0.010".

Compositions of the cements used are as follows:

*Example I*

|  | Percent |
|---|---|
| Vinyl-vinylidene resin | 30.0 |
| Methyl ethyl ketone | 70.0 |

*Example II*

| Vinyl-vinylidene resin | 30.0 |
|---|---|
| Methyl ethyl ketone | 30.0 |
| Toluene | 40.0 |

*Example III*

| Vinyl-vinylidene resin | 30.0 |
|---|---|
| Methyl ethyl ketone | 65.0 |
| Dioctyl phthalate | 5.0 |

*Example IV*

| Polyvinyl chloride | 7.5 |
|---|---|
| Methyl ethyl ketone | 85.0 |
| Dioctyl phthalate | 10.0 |

*Example V*

| Polyvinyl chloride-vinyl acetate | 10.0 |
|---|---|
| Methyl ethyl ketone | 80.0 |
| Dioctyl phthalate | 10.0 |

The addition of a plasticizer, as noted in Examples III to V, has been found to yield a softer and more pliable resin coating or cement.

For most applications, the deposited film 16 should be sufficiently thick, and soft and pliable enough to form a cushioning bed for glass filamentary material 18 which is wrapped or wound on the still tacky cement film prior to evaporation of the solvent. This may be accomplished by placing the wrapping or winding device adjacent the film coating or applying device so that the wrapping or winding takes place before the solvent has a chance to evaporate and while the cement film is still soft and spongy to permit embedding of the glass filaments therein.

As shown in Fig. 1, the glass filamentary material is applied helically in well known wrapping or winding manner such as disclosed in Patent No. 2,249,781, and it is to be noted that the individual glass filaments are parallel prior to wrapping and remain substantially parallel in the applied wrapping. As a result, when they are positioned on the cement film, the glass filaments which are under slightly greater tension are free to move relatively to the other glass filaments present and tend to embed themselves deeper in the spongy cement film.

As shown in Fig. 2, the glass filaments 18' embed themselves at varying depths within the cement film in proportion to the existing tension, with the greater tensioned filaments being embedded to a greater extent. This, as a result, equalizes the slight differences in tension which arise during the wrapping or winding. Upon evaporation of the solvent, the glass filament will be firmly and securely embedded in the spongy cement film 16. Therefore, when the cable or conductor 10 is placed under stress at a later time or is twisted or flexed, the load is distributed evenly and equally on the glass filament serve which has been embedded in the cement film.

Due to the embedding and locking in of the glass filaments in the spongy film 16, there is no possibility of its unraveling or sleeving, whereby bunching or uneven distribution of coating may result during further processing or manufacturing. As a result, an outer protective insulating jacket 20 may be applied by extrusion or any other desired means without any of the difficulties previously mentioned.

Additionally, even if some of the filaments should break, which possibility is considerably decreased, the filaments, being embedded or permanently secured in the cement film 16 will not protrude therefrom or be loosened to break off to cause added difficulties.

Although the present invention has been described and illustrated in connection with an inner insulating jacket and an outer insulating jacket with an interposed glass filamentary barrier, it is to be stated that such is not to be considered limitative of the invention but merely illustrative. For example, the inner insulating jacket could be omitted and the spongy cement applied directly to the metallic conductor and the glass filaments embedded therein, as shown in Fig. 3. In such a case it is desirable to make the applied spongy film thicker than when an inner jacket is used. Similarly, several layers of insulating materials could be used to form a series of jackets each separated by a glass filamentary barrier, as desired.

Other variations and modifications may be made within the scope of the claims and portions of the improvements may be used without others.

I claim:

1. An insulated electrical conductor comprising a metallic conductor, a primary insulating jacket surrounding and in contact with said conductor, said jacket having a cementitious surface layer, an insulating and strengthening barrier in the form of a serving comprising a plurality of separate, unconnected, substantially parallel filaments of glass filamentary material on said layer, said surface layer including a volatile solvent and having a thickness sufficient to enable embedding of the separate glass filaments therein to varying depths in accordance with the winding tension in the separate filaments before the solvent has evaporated and while the layer is spongy, whereby the tensions on the individual glass filaments are substantially equalized, said filaments being locked in said cementitious surface layer when the solvent is evaporated therefrom, and an outer protective insulating jacket on said filament-embedded cementitious surface layer.

2. An insulated electrical conductor comprising a metallic conductor, a primary insulating jacket surrounding and in contact with said conductor, a cement film deposited on and adhesively secured to the surface of said primary jacket, an insulating and strengthening barrier extending over the film in the form of a winding comprising a flat ribbon having a plurality of separate, unconnected, substantially parallel filaments of glass filamentary material, said film including a volatile solvent and having a thickness sufficient to enable the individual glass filaments to be embedded to varying depths in accordance with the winding tension in the separate filaments before the solvent has evaporated and while the film is spongy whereby the tensions on the individual glass filaments are equalized, and an outer protective insulating jacket on said filament-embedded cement film.

3. An insulated electrical conductor comprising a metallic conductor, a primary insulating jacket surrounding and in contact with said conductor, said jacket consisting essentially of polyvinyl chloride-vinylidene chloride co-polymer and having a cementitious surface layer, an insulating and strengthening barrier in the form of a serving comprising a plurality of helically wound, separate, unconnected, substantially parallel filaments of glass filamentary material on said layer, said surface layer including a volatile solvent and having a thickness sufficient to enable embedding of the separate glass filaments therein to varying depths in accordance with the winding tension in the separate filaments before the solvent has evaporated and while the layer is spongy, whereby the tensions on the individual glass filaments are substantially equalized, said filaments being locked in said cementitious surface layer when the solvent is evaporated therefrom, and an outer protective insulating jacket on said filament-embedded cementitious surface.

4. An insulated electrical conductor comprising a metallic conductor, a primary insulating jacket surrounding and in contact with said conductor, a cement film consisting essentially of polyvinyl chloride-vinylidene chloride co-polymer and a volatile solvent deposited on and adhesively secured to the surface of said primary jacket, an insulating and strengthening barrier in the form of a serving comprising a plurality of helically wound, separate, unconnected, substantially parallel filaments of glass filamentary material extending over said cement film, said film having a thickness sufficient to enable the individual glass filaments to be embedded in the film to varying depths in accordance with the winding tension in the separate filaments before the solvent has evaporated and while the film is spongy whereby the tensions on the individual glass filaments are substantially equalized, and an outer protective insulating jacket on said filament-embedded cement film.

5. An insulated electrical conductor comprising a metallic conductor, an insulating jacket of a cementitious material, including a volatile solvent, surrounding said conductor, an insulating and strengthening barrier thereon in the form of a serving comprising a band having a plurality of separate, unconnected, parallel filaments of glass filamentary material wound around the jacket, said jacket having a thickness to enable the separate filaments to be embedded in said cementitious material to varying depths in accordance with the tension in each filament before the solvent has evaporated and while the cementitious material is spongy whereby the tensions on the individual glass filaments are substantially equalized, said filaments being locked in said cementitious material when the solvent is evaporated therefrom, and an outer protective insulating jacket surrounding said filament-embedded cementitious material.

References Cited in the file of this patent

UNITED STATES PATENTS

| 2,164,904 | Cook | July 4, 1939 |
| 2,187,401 | Potter | Jan. 16, 1940 |
| 2,217,451 | Patnode | Oct. 8, 1940 |
| 2,227,931 | Greenleaf | Jan. 7, 1941 |
| 2,243,560 | Hall et al. | May 27, 1941 |
| 2,247,064 | Nowak | June 24, 1941 |
| 2,258,218 | Rochow | Oct. 7, 1941 |
| 2,352,426 | Engh | June 27, 1944 |
| 2,365,019 | Stewart | Dec. 12, 1944 |
| 2,370,046 | Keyes | Feb. 20, 1945 |
| 2,426,413 | Pollett | Aug. 26, 1947 |
| 2,454,625 | Bondon | Nov. 23, 1948 |
| 2,516,030 | Swiss | July 18, 1950 |
| 2,606,134 | Sanders | Aug. 5, 1952 |